(12) United States Patent
Maniwa et al.

(10) Patent No.: US 8,596,161 B2
(45) Date of Patent: Dec. 3, 2013

(54) STEERING POSITION ADJUSTMENT DEVICE

(75) Inventors: Takahiro Maniwa, Gunma-ken (JP); Mitsuo Yabutsuka, Gunma-ken (JP)

(73) Assignee: Yamada Manufacturing Co., Ltd., Kiryu-Shi, Gunma-Ken (JP)

( * ) Notice: Subject to any disclaimer, the term of this patent is extended or adjusted under 35 U.S.C. 154(b) by 239 days.

(21) Appl. No.: 12/929,698

(22) Filed: Feb. 9, 2011

(65) Prior Publication Data
US 2011/0203403 A1    Aug. 25, 2011

(30) Foreign Application Priority Data
Feb. 19, 2010    (JP) .................................. 2010-034531

(51) Int. Cl.
*B62D 1/16*    (2006.01)
*B62D 1/18*    (2006.01)

(52) U.S. Cl.
USPC ............................................. 74/493; 74/492

(58) Field of Classification Search
USPC ............. 74/492–495; 280/775–777; 267/275, 267/285
See application file for complete search history.

(56) References Cited

U.S. PATENT DOCUMENTS

| | | | |
|---|---|---|---|
| 4,593,882 A * | 6/1986 | West .............................. | 251/243 |
| 5,230,533 A * | 7/1993 | Yamaguchi ................... | 280/775 |
| 5,452,917 A * | 9/1995 | Fujiu et al. .................... | 280/777 |
| 5,704,641 A * | 1/1998 | Shimizu et al. ............... | 280/775 |
| 5,743,150 A * | 4/1998 | Fevre et al. .................... | 74/493 |
| 7,219,927 B2 * | 5/2007 | Lee ................................ | 280/777 |
| 7,735,391 B2 * | 6/2010 | Osawa et al. .................. | 74/493 |
| 2005/0093283 A1 * | 5/2005 | Yamada ........................ | 280/775 |
| 2005/0104353 A1 * | 5/2005 | Ikeda et al. ................... | 280/775 |
| 2005/0225068 A1 * | 10/2005 | Ishida et al. .................. | 280/775 |
| 2006/0214410 A1 * | 9/2006 | Sawada et al. ................ | 280/775 |
| 2006/0230864 A1 * | 10/2006 | Shinohara et al. ............. | 74/492 |
| 2006/0273568 A1 * | 12/2006 | Manwaring et al. .......... | 280/777 |
| 2009/0013818 A1 * | 1/2009 | Arbanas et al. ................ | 74/493 |
| 2009/0107283 A1 * | 4/2009 | Uesaka .......................... | 74/493 |

FOREIGN PATENT DOCUMENTS

JP    2009-006740    1/2009

* cited by examiner

*Primary Examiner* — Troy Chambers
*Assistant Examiner* — Jake Cook
(74) *Attorney, Agent, or Firm* — McGinn Intellectual Property Law Group, PLLC

(57) ABSTRACT

A spring for assisting a tilt adjustment operation can be easily and rapidly attached to a fixed bracket and a movable bracket. Each of two flanges of a fixed bracket has a tilted flange plate and a locking piece. The locking piece has a guiding edge, a locking recess, an insertion recess, and a fixing hole. In a spring member, a first locking shaft portion is formed on the rear side of two coil portions, and a second locking shaft portion is formed rearward from the distal end of the first locking shaft portion. The first locking shaft portion is engaged with the locking recess, and the second locking shaft portion is engaged with the fixing hole. The distance between the first locking shaft portions of the spring member is less that the distance between the two guiding edges.

19 Claims, 6 Drawing Sheets

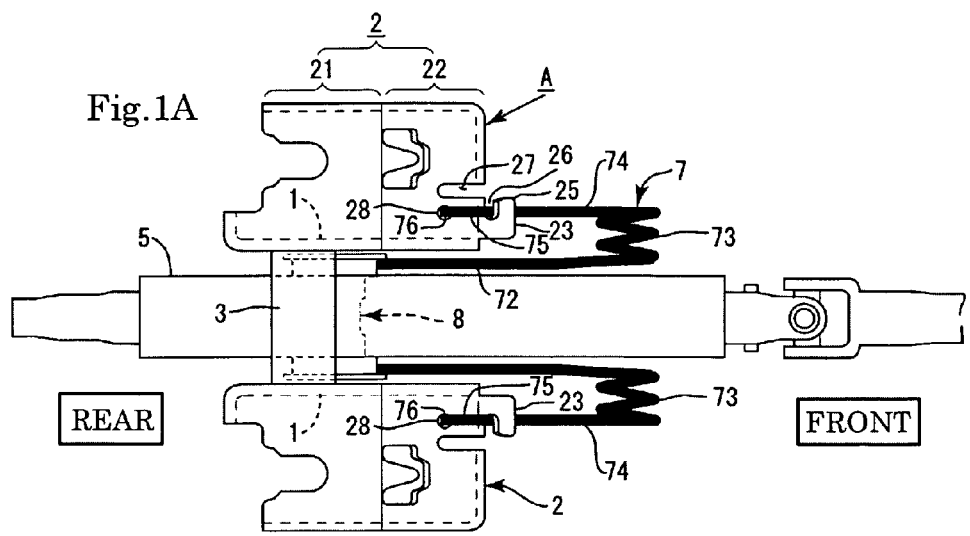
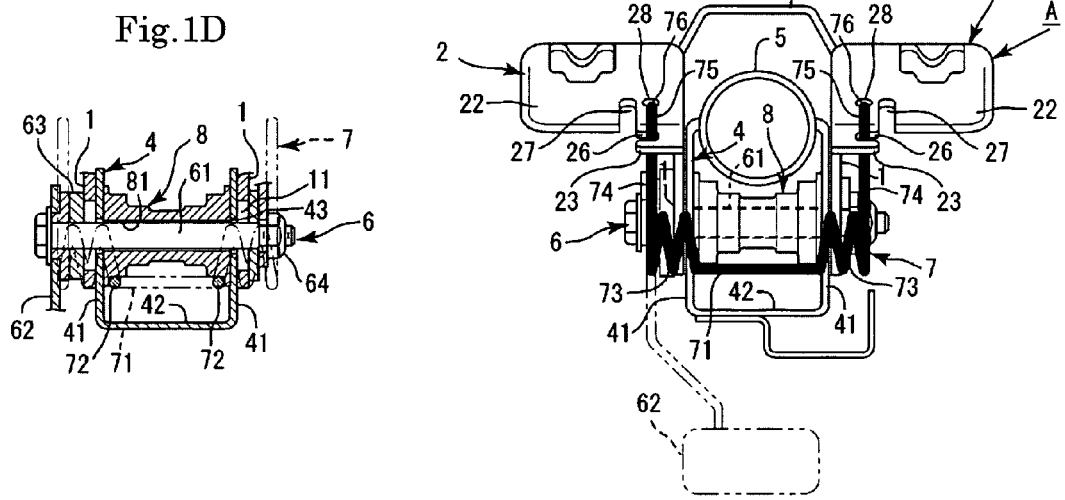
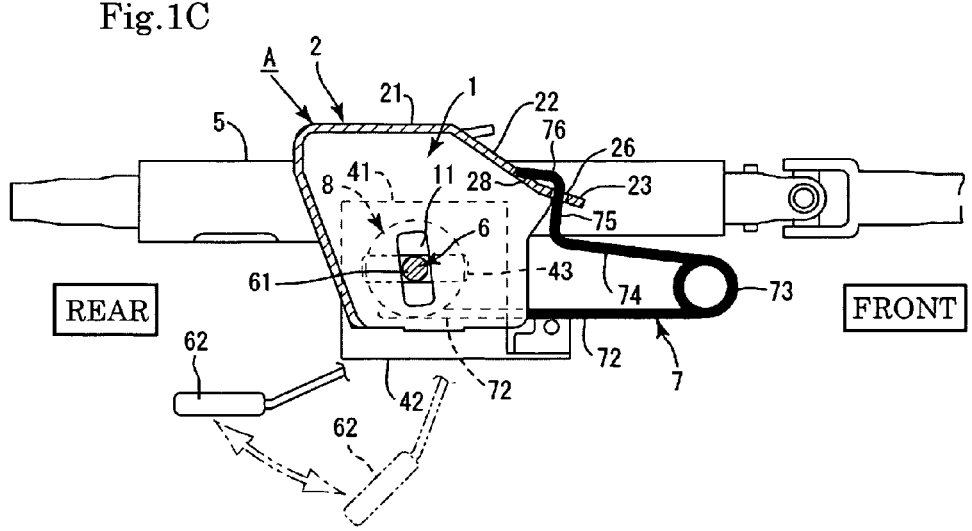

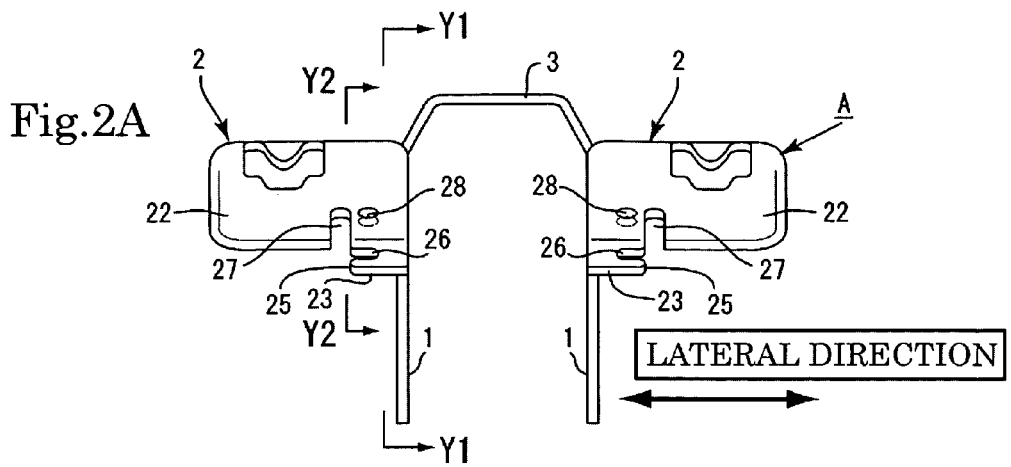
Fig.2A
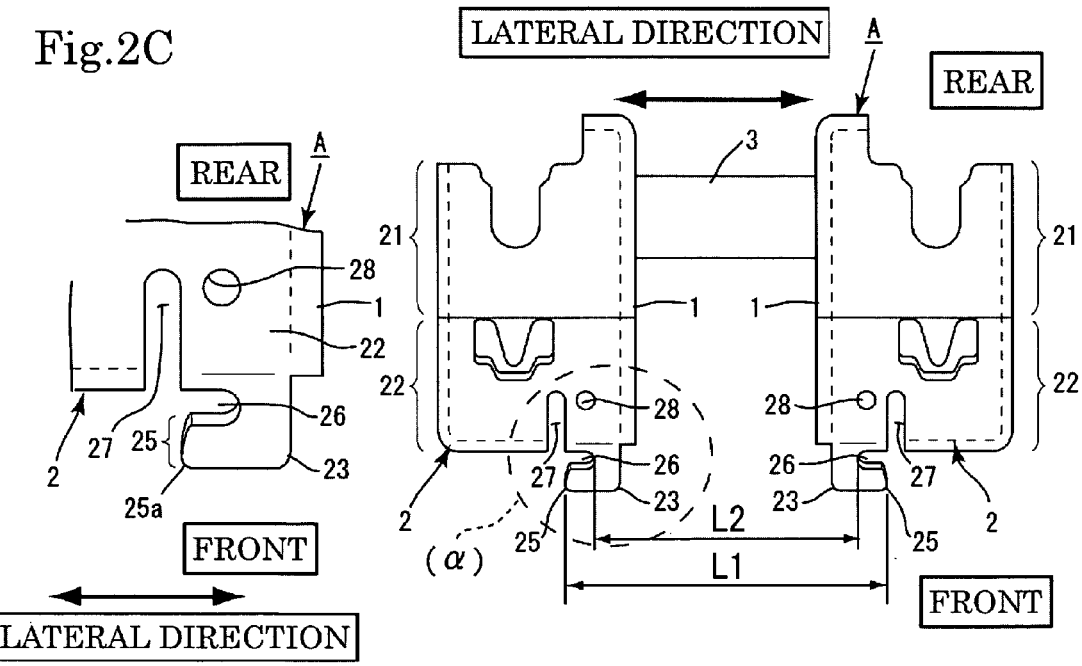
Fig.2B
Fig.2C
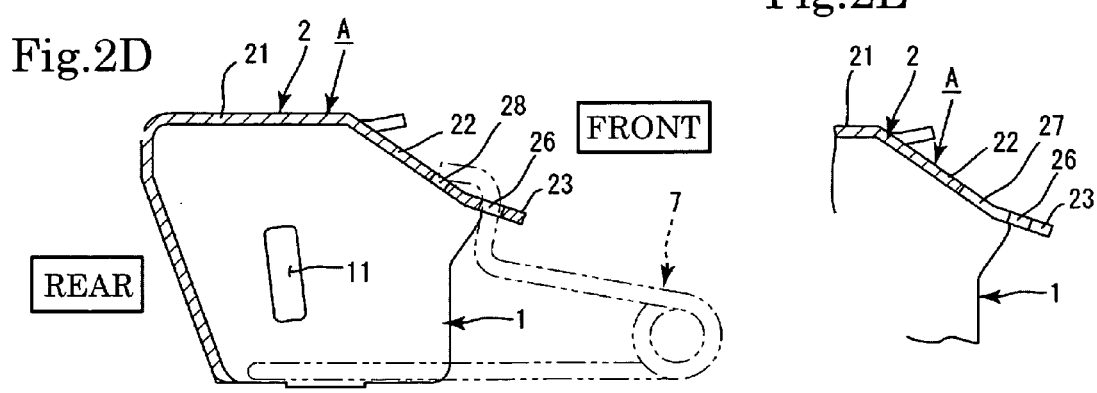
Fig.2D
Fig.2E

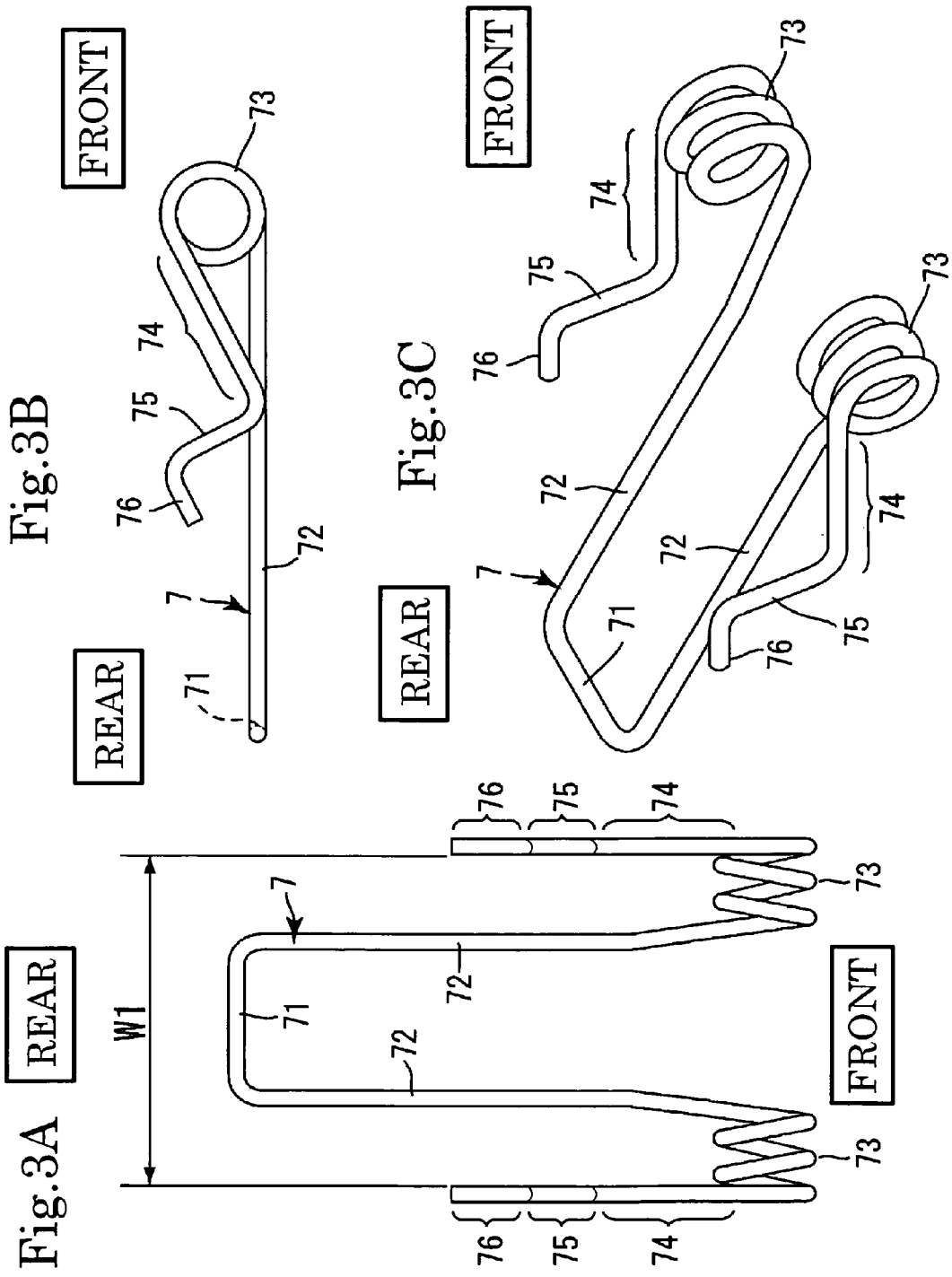

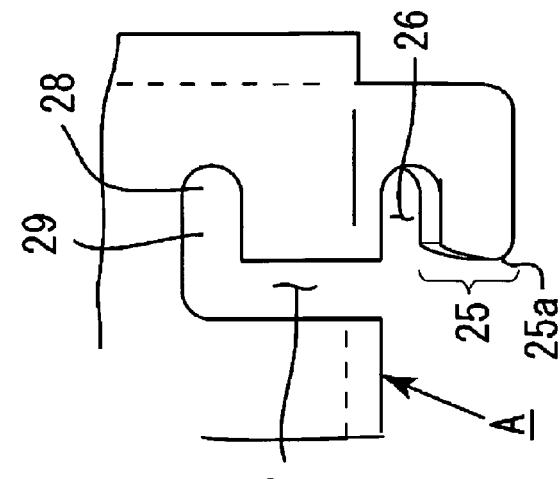
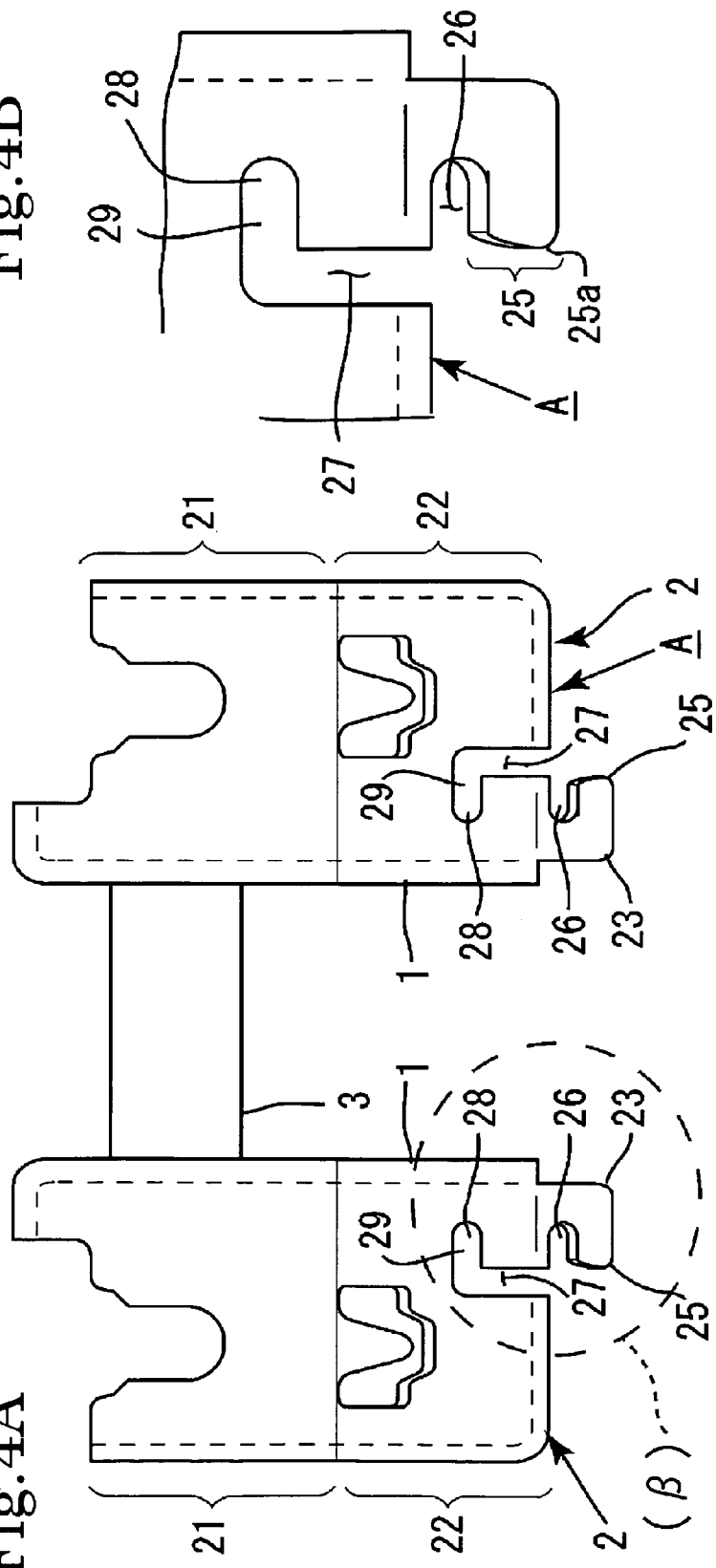

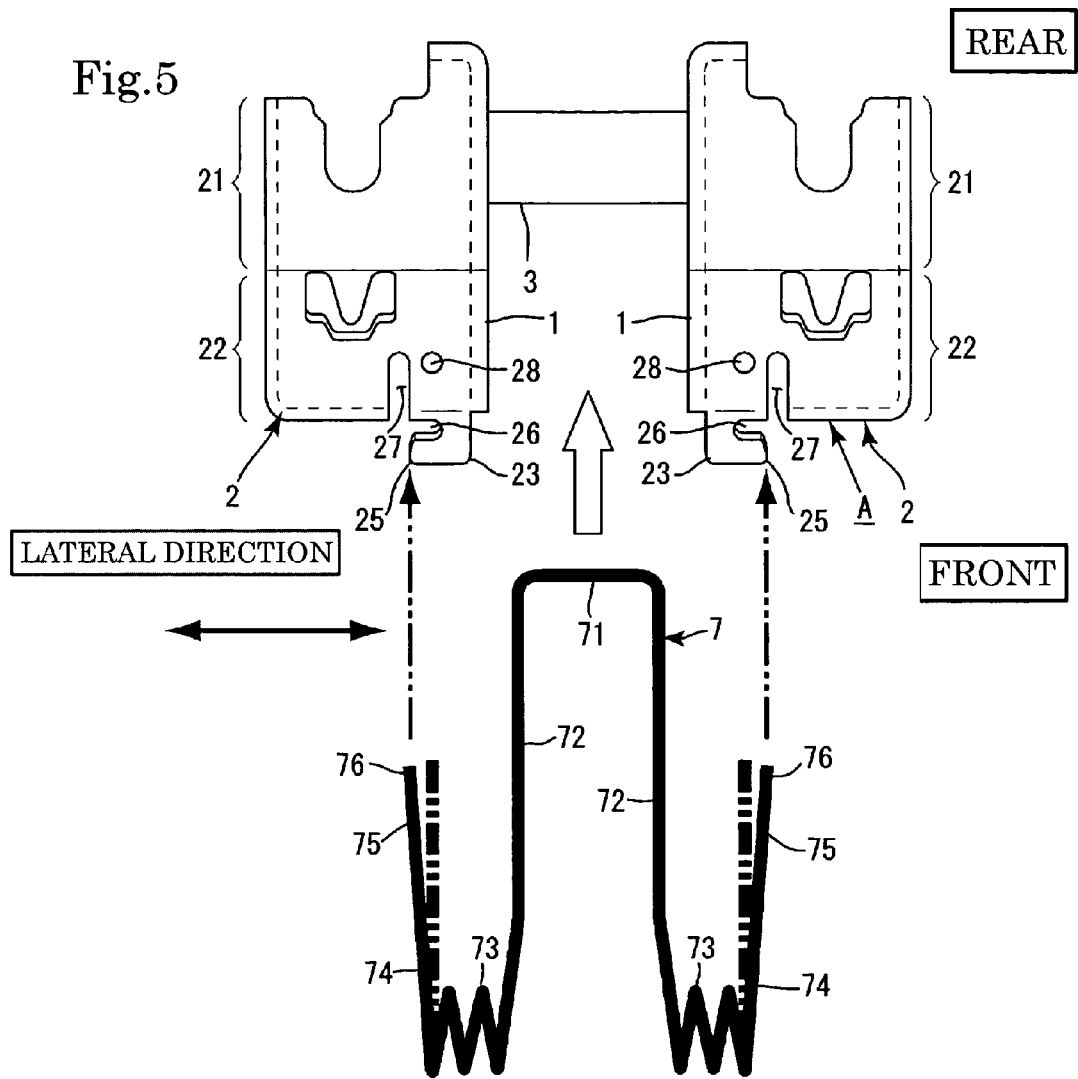

STEERING POSITION ADJUSTMENT DEVICE

BACKGROUND OF THE INVENTION

1. Field of the Invention

The present invention relates to a steering position adjustment device by which a spring for assisting a tilt adjustment operation can be easily and rapidly attached to a fixed bracket and a movable bracket that supports a steering column and is mounted on the fixed bracket to perform a tilting operation.

2. Description of the Related Art

In a conventional steering position adjustment device, a torsion coil spring for constantly biasing a steering column to the upper side of a tilt is disposed between the steering column and an upper bracket for attachment to the vehicle body. The steering column is constantly biased to the upper side of a tilt by the biasing force of the torsion coil spring. Thus, when the steering column is unlocked for tilt adjustment, the steering wheel tends to tilt downward under own weight of the steering column and steering wheel, and by mounting the torsion coil spring, this tilting of the steering wheel side is prevented, and even if the weight of the steering column and steering wheel is large, the driver can easily support the steering wheel by a hand and readily adjust the tilt position.

A large number of torsion coil springs are used in such steering position adjustment devices. A steering position adjustment device of this kind is described in Japanese Patent Application Publication No. 2009-6740. In the general explanation below, the reference numerals used in Japanese Patent Application Publication No. 2009-6740 will be placed in parentheses. The steering position adjustment device is constituted by coil portions (61, 61) disposed on the left and right side, with the axial center of a steering column being disposed therebetween, rearward extending portions (62, 62) extending rearward of the vehicle body from both ends on the inner side of the coil portions (61, 61) (axial center side of the steering column (1)), an abutment portion (63) connecting rear ends of the rearward extending portions (62, 62), and U-shaped hooks (64, 64) formed at both ends on the outer side of the coil portions (61, 61) (side far apart from the axial center of the steering column (1)). Catch portions (39, 39) engaging with hooks (64, 64) of a torsion coil spring (6) are formed to protrude in the direction of withdrawal from the axial center of the steering column (1) at side plates (32A, 32B) of an upper vehicle body attachment bracket (3).

The catch portions (39, 39) have a quadrangular shape, when viewing the upper vehicle body attachment bracket (3) from the lower surface, and U-shaped notch grooves (391, 391) are formed therein. The torsion coil spring (6) in the Japanese Patent Application Publication No. 2009-6740 that has the above-described configuration is assembled by catching the hooks (64, 64) of the torsion coil spring (6) on the notch grooves (391, 391) of the catch portions (39, 39) of the upper vehicle body attachment bracket (3) to obtain a pre-assembled member. The upper vehicle body attachment bracket (3) having the hooks (64, 64) of the torsion coil spring (6) caught thereon, that is, the pre-assembled member, is assembled with the steering column (1) and assembled on the circumference of elongated grooves (33A, 33B) for tilting. At this time, the parts on the circumference of the elongated grooves (33A, 33B) for tilting are assembled, while maintaining the horizontal position of the central axial line of the steering column (1) against the biasing force of the torsion coil spring (6).

The spring (torsion coil spring (6)) is generally assembled by a complex process requiring a large number of manual operations. Further, the torsion coil spring plays a role of biasing the steering column and steering wheel upward, the elastic force is strong, a large force acting against the biasing force of the torsion coil spring (6) is necessary to assembly the torsion coil spring (6) and a load on the worker is large. Where the elastic force of the torsion coil spring (6) is decreased to reduce the load of the worker, the torsion coil spring (6) can easily slip out of the U-shaped notch groove (391).

Further, the assembling on the circumference of the elongated grooves (33A, 33B) for tilting should be performed, while maintaining the steering column (1) in a substantially horizontal state against the biasing force of the torsion coil spring (6), which requires the worker to apply a large force. Since the worker is required to apply continuously a force acting against the biasing force of the torsion coil spring (6) through the entire assembling operation, a load on the worker is very high. Accordingly, an object to be attained (a technical problem to be resolved) by the present invention is to enable easy and fast assembling of the torsion coil spring with the fixed bracket and movable bracket even through the elastic force of the torsion coil spring is strong.

SUMMARY OF THE INVENTION

The inventors have conducted comprehensive research aimed at the resolution of the above-described problems and the results obtained demonstrated that the problems can be resolved by the invention relating to a steering position adjustment device, including: a fixed bracket having flanges formed on both sides in a lateral direction of the fixed bracket; a movable bracket attached to the fixed bracket and having a column pipe mounted thereon; and a spring member, wherein both of the flanges have a tilted flange plate tilted forward and downward, a locking piece is formed to protrude forward from a front end of the tilted flange plate, a lateral outer end edge and a front side of the locking piece are formed as a guiding edge, a locking recess is formed on a rear side and on an inside, in the lateral direction, of the guiding edge, the guiding edge is formed to tilt inward in the lateral direction towards the locking recess, an insertion recess is formed from a front end toward a rear end with a position, in the tilted flange plate, that substantially matches the lateral position of the guiding edge being taken as a lateral inner position, a fixing hole is formed adjacently to the insertion recess on the inner side of the end portion thereof, the locking recess and the fixing hole are formed such that lateral positions thereof substantially match each other, in the spring member coil portions are formed at both lateral sides with an axial center of the column pipe being disposed therebetween, first locking shaft portions are formed rearward from the coil portions, second locking shaft portions are formed rearward from distal ends of the first locking shaft portions, the first locking shaft portions are engaged with the locking recesses, the second locking shaft portions are engaged with the fixing holes, and a distance between the first locking shaft portions of the spring member is less than a distance between the guiding edges of the fixed bracket.

According to the present invention, the distance between the first locking shaft portions of the spring member is less than the distance between the two guiding edges of the fixed bracket. Therefore, the spring member can be assembled by using an elastic restoration force of the spring member, a small force is sufficient for the assembling, and the load on the worker can be reduced. Since the guiding edge tilted on the inner side in the lateral direction towards the locking recess is provided at the vehicle front side of the locking recess, the first locking shaft portion of the spring member can be smoothly guided into the locking recess by the elastic restoration force of the spring member.

Since the fixing hole is formed adjacently to the insertion recess on the inner side of the end portion thereof, where the first locking shaft portion is locked in the locking recess, the second locking shaft portion is also locked in the fixing hole by the elastic restoration force of the spring member and assembling operability is improved. Since the second locking shaft portion of the spring member is easily and stably attached to the fixing hole, the spring member can be held stably and upward biasing during tilting operation can be performed stably and effectively.

BRIEF DESCRIPTION OF THE DRAWINGS

FIG. 1A is a plan view of the steering device in accordance with the present invention; FIG. 1B is a front view illustrating an assembly of the fixed bracket and movable bracket in accordance with the present invention; FIG. 1C is a side view of the steering device in accordance with the present invention; FIG. 1D is a front view with a vertical section of a collar location in accordance with the present invention;

FIG. 2A is a front view of the front side of the fixed bracket in accordance with the present invention; FIG. 2B is a plan view of the fixed bracket; FIG. 2C is an enlarged view of (α) in FIG. 2B; FIG. 2D is a sectional view along the Y1-Y1 arrow in FIG. 2A; FIG. 2E is a sectional view along the Y2-Y2 arrow in FIG. 2A;

FIG. 3A is a plan view of the spring member; FIG. 3B is a side view of the spring member; FIG. 3C is a perspective view of the spring member;

FIG. 4A is a plan view of the fixed bracket according to another embodiment; FIG. 4B is an enlarged view of (β) in FIG. 4A;

FIG. 5 is a plan view of the fixed bracket and spring member; and

DESCRIPTION OF THE PREFERRED EMBODIMENTS

Figure 6A:
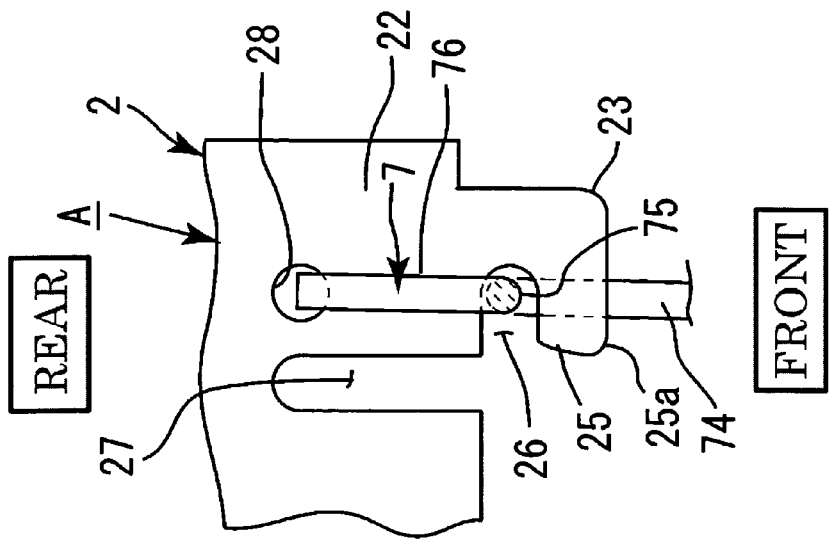
FIGS. 6A to 6C is a principal enlarged view illustrating the process in which the spring member is fixed to the flanges.

An embodiment of the present invention will be described below with reference to the appended drawings. As shown in FIG. 1, the main configuration in accordance with the present invention is constituted by a fixed bracket A, a movable bracket 4, a spring member 7, and a collar 8. Further, in the present invention, notations "Forward" and "Rearward" indicating the direction are present for the sake of convenience of explanation. In the device in accordance with the present invention, "forward" relates to a position on the advance direction side in a state of attachment to the automobile body, and "rearward" relates to a position on the steering wheel side. Further, "lateral direction" represents a left-right direction of the vehicle body. The notations indicating "forward", "rearward" and "lateral direction" in accordance with the present invention are shown in the main figures.

In the fixed bracket A, as shown in FIGS. 2A and 2B, fixing side plates 1, 1 are formed with an appropriate spacing in the lateral direction, and flanges 2, 2 are formed from upper ends of the fixing side plates 1, 1. Both fixing side plates 1, 1 and both flanges 2, 2 are configured with left-right symmetry in the lateral direction of the fixed bracket A. The fixing side plate 1 and the flange 2 may be formed integrally by pressing or the like, or may be formed from separate members by welding or the like. Tilt holes 11, 11 for allowing the movable bracket 4 to tilt with respect to the fixed bracket A are formed in both fixing side plates 1, 1. The fixing side plates 1, 1, are connected by a fixing connection portion 3. Alternatively, the fixing connection portion 3 can be configured to connect the flanges 2, 2 to each other.

The flanges 2, 2, are constituted by an attachment flange plate 21 and a tilted flange plate 22 (see FIGS. 2B and 2D). The attachment flange plate 21 serves as a shock absorbing member and a capsule member and also as a site for attaching the fixing bracket A to a predetermined location in the vehicle body and is formed as a substantially flat surface. The tilted flange plate 22 is formed on the front side of the vehicle body with respect to the attachment flange plate 21 and is a surface plate tilted inward from the rear side to the front side (see FIGS. 2D and 2E). The attachment flange plate 21 is formed integrally with the tilted flange plate 22.

As shown in FIG. 2, a locking piece 23 is formed below the tilted flange plate 22. The expression "below the tilted flange plate 22" means a front end location. Also, the locking piece 23 is formed in a position on the inner end side in the lateral direction of the tilted flange plate 22 (see FIGS. 2A and 2B). The inner end side in the lateral direction of the tilted flange plate 22 as referred to herein means the side where the fixed side plate 1 is formed. The locking piece 23 is formed as a substantially rectangular plate. The locking piece 23 is tilted downward from the front side to the rear side and is formed with a small gradient such that the locking piece is closer to the horizontal plane than the tilted flange plate 22 (see FIGS. 2D and 2E). The gradient is appropriately set according to the shape of the spring member 7.

As shown in FIGS. 2A to 2C, a guiding edge 25 and a locking recess 26 are formed in the locking piece 23. An insertion recess 27 and a fixing hole 28 are formed in the tilted flange plate 22. The guiding edge 25 formed in the locking piece 23 is formed on the outer end side in the lateral direction of the locking piece 23 and close to the front side (see FIGS. 2B and 2C). The locking recess 26 is formed on the oblique upper side of the locking piece 23, that is, on the front side in the front-rear direction and is formed in a substantially notch-like shape from an outer end inward in the lateral direction of the locking piece 23. More specifically, the locking recess 26 is formed as a substantially U-shaped recess opened on the outer end side in the lateral direction of the locking piece 23 (see FIGS. 2B and 2C).

The guiding edge 25 is formed as an end edge that is inclined inward in the lateral direction of the locking piece 23 with the transition from the front side to the rear side. Thus, the two guiding edges 25, 25 formed in the two locking pieces 23, 23 are formed in a substantially truncated chevron shape configuration from the front side to the rear side of the flanges 2, 2 (see FIG. 2B). Further, the front end portion of the guiding edge 25 is formed as an arch-like front end edge 25a that protrudes in a substantially circular arc shape (see FIG. 2C). The slope of the guiding edge 25 may be substantially flat or curved.

The insertion recess 27 formed in the tilted flange plate 22 is formed to extend from the front to the rear so that the opening is located at the front end of the tilted flange plate 22 (see FIGS. 2A to 2C and 2E). The insertion recess 27 is formed in a substantially U-like shape, and an inner side edge in the lateral direction of the insertion recess 27 and a most protruding portion of the guiding edge 25 that is the outer end edge in the lateral direction of the locking piece 23 are formed such that they substantially coincide on a straight line in the front-rear direction (see FIG. 2C). The inner side edge in the lateral direction of the insertion recess 27 is a side edge positioned farther inward in the lateral direction of the tilted flange plate 22 where the insertion recess 27 is formed.

In the tilted flange plate 22, the fixing hole 28 is formed adjacently to the insertion recess 27 on the inner side so as to match substantially the end portion location thereof (see FIG. 2C). A closed end portion of the locking recess 26 is an end portion positioned farther inward in the lateral direction of the tilted flange plate 22 where the locking recess 26 is formed.

In the configuration according to another embodiment of the present invention, the insertion recess 27 and the fixing hole 28 communicate (see FIG. 4). In this embodiment, the insertion recess 27 and the fixing hole 28 are formed to communicate via a joint-like through hole 29. More specifically, a groove that has a substantially L-like shape as a whole is formed in which the joint-like through hole 29 is formed along the lateral direction from a rear end portion of the insertion recess 27 and the joint-like through hole 29 reaches the fixing hole 28 (see FIG. 4B).

As shown in FIG. 1, in the movable bracket 4, movable side plates 41, 41 are provided with an appropriate spacing both lateral sides, and a movable bottom plate 42 is formed at the lower ends of the movable side plates 41, 41. A column pipe 5 is mounted between the movable side plates 41, 41. Both movable side plates 41, 41 of the movable bracket 4 are disposed between fixing side plates 1, 1 of the fixed bracket A and connected to each other by a tightening tool 6. Telescopic holes 43, 43 are formed in the movable side plates 41, 41 so as to enable tilting and telescopic movement with respect to the fixed bracket A. The telescopic holes 43, 43 are formed to be elongated in the front-rear direction of the vehicle body (see FIG. 10).

The tightening tool 6 is mainly constituted by a bolt shaft 61, an operation lever 62, and an adjustment cam 63 (see FIG. 1D). A collar 8 is a member formed in a substantially round shape provided with a step, and an axial hole 81 is formed along the axial direction in the diametric center thereof. The collar 8 is disposed between the movable side plates 41, 41 of the movable bracket 4. Further, the movable bracket 4 is clamped by the fixing side plates 1, 1 of fixed bracket A, and a bolt shaft 61 of the tightening tool 6 passes through both tilt holes 11, 11 of the fixed bracket A, both telescopic holes 43, 43 of the movable bracket 4, and the axial hole 81 of the collar 8. The adjustment cam 63 is disposed on the outside of one fixed side plate 1 of the fixed bracket A, and the bolt shaft 61 protruding from the tilt hole 11 of the fixed side plate 1 on the other side is fixed with a nut 64 (see FIG. 1D).

The configuration of the spring member 7 has a front-rear direction similarly to the fixed bracket A, and the front-rear direction of the spring member 7 is identical to that of the fixed bracket A. First, as shown in FIG. 3A, first elastic shaft portions 72, 72 are formed forward from both lateral sides of a connection shaft portion 71, coil portions 73, 73 are formed with the left-right symmetry at front axial ends of the two first elastic axial portions 72, 72, second elastic shaft portions 74, 74 are formed rearward from the two coil portions 73, 73 towards the connection shaft portion 71, first locking shaft portions 75, 75 are formed upward from the respective rear axial ends of the two second elastic shaft portions 74, 74, and second locking shaft portions 76, 76 are formed rearward from the respective axial ends of the first locking shaft portions 75, 75. The elastic constants of the two coil portions 73, 73 are set to be equal to each other. The first locking shaft portion 75 is bent at a substantially right angle to the second elastic shaft portion 74, and the second locking shaft portion 76 is bent at a substantially right angle to the first locking shaft portion 75.

The spring member 7 is mounted along both the fixed bracket A and the movable bracket 4, and the configuration of the spring member 7 in a mounted state is such that coil portions 73, 73 are formed at both lateral sides, with the axial center of the column pipe 5 being disposed therebetween (see FIG. 1). As described hereinabove, the collar 8 is disposed at both movable side plates 41, 41 of the movable bracket 4, and the bolt shaft 61 of the tightening tool 6 passes through the collar 8 (see FIG. 1D). The first elastic shaft portions 72, 72 of the spring member 7 apply pressure to the bolt shaft 61 of the tightening tool 6 via the collar 8 (see FIG. 1D), the first locking shaft portions 75, 75 and the second locking shaft portions 76, 76 are locked to the locking recesses 26, 26 and fixing holes 28, 28 of the fixed bracket A, and the first elastic shaft portions 72, 72 and the second elastic shaft portions 74, 74 swing elastically about the coil portions 73, 73 substantially as the swinging centers, thereby elastically biasing upward the column pipe 5 mounted on the movable bracket 4.

Further, the first elastic shaft portions 72, 72 of the spring member 7 apply pressure to the bolt shaft 61 of the tightening tool 6 via the collar, thereby supporting the column pipe 5 mounted on the movable bracket 4, and can reduce a load of a vertical operation in tilt adjustment of the movable bracket 4 even in a state in which the movable bracket 4 can tilt with respect to the fixed bracket due to relaxation of the tightening tool 6.

The dimensions of the fixed bracket A and the spring member 7 will be explained below. The distance W1 between the first locking shaft portions 75, 75 of the spring member 7 is less than the distance L1 between the guiding edges 25, 25 of the fixed bracket A (see FIGS. 2B, 3A, and 5). Thus, W1<L1. Further, the distance W1 between the first locking shaft portions 75, 75 of the spring member 7 is equal to or slightly less than the distance L2 between the closed ends of the locking recesses 26, 26. Thus, W1≤L2. Therefore, where the first locking shaft portions 75, 75 of the spring member 7 are engaged with the locking recesses 26, 26, the spring member 7 is prevented from slipping out of the locking recesses 26, 26 by an elastic restoration force of the spring member 7. The width of the holes in the locking recess 26 and insertion recess 27 in both flanges 2, 2 is larger than the axial diameter of the spring member 7, and the first locking shaft portion 75 and the second locking shaft portion 76 of the spring member 7 can be inserted with a clearance.

Figure 6B:
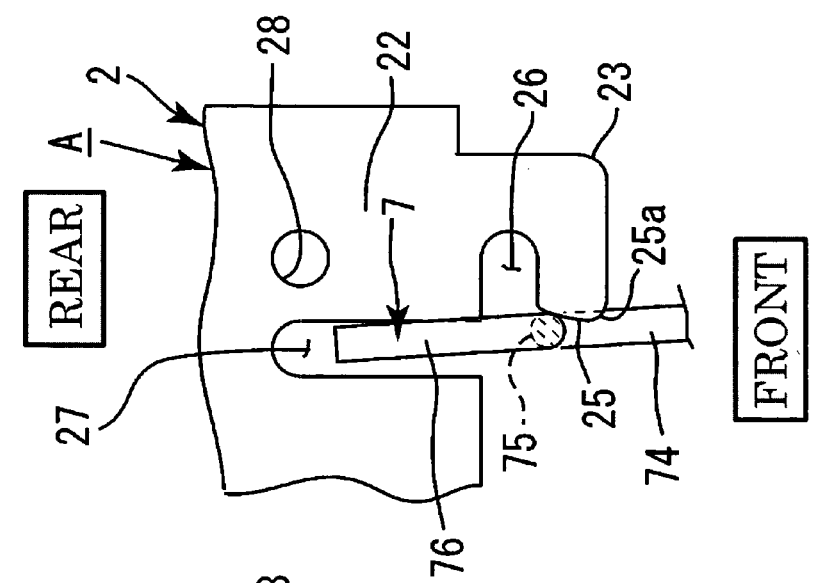
Figure 6C:
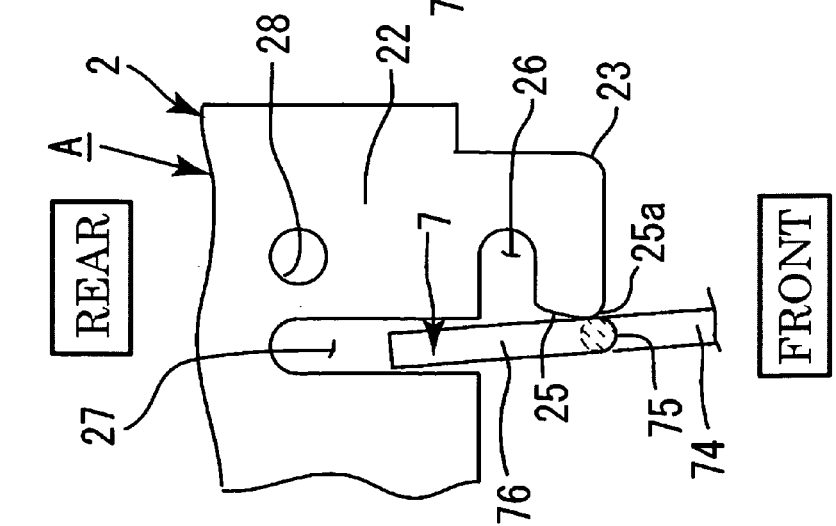

A process of mounting the spring member 7 on the flanges 2, 2, of the fixed bracket A will be explained below. The fixed bracket A and the spring member 7 are aligned in the front-rear direction (see FIG. 5), the spring member 7 is positioned on the front side of the fixed bracket A, and the second locking shaft portions 76, 76 are inserted into the end portions of the insertion recesses 27, 27, while expanding the spring member 7 in the lateral direction with a jig or the like. As a result, the first locking shaft portions 75, 75 abut on the guiding edges 25, 25 of the locking pieces 23, 23 (see FIG. 6A).

Where the force of a jig or the like that has been expanding the spring member 7 is thereafter relaxed, the first locking shaft portions 75, 75 of the spring member 7 are moved rearward along the slope of the two guiding edges 25, 25 by the elastic restoration force and guided smoothly in the locking recesses 26, 26. The first locking shaft portions 75, 75 are accommodated in the locking recesses 26, 26 and locked therein (see FIG. 6C). Following this process, the two second locking shaft portions 76, 76 are locked and fixed by themselves from the insertion recesses 27, 27 to the fixing holes 28, 28. The spring member 7 may be also assembled when the attachment flange plate 21 of the fixed bracket A is on the lower side.

Thus, in the process till the first locking shaft portion 75 of the spring member 7 is locked in the locking recess 26, the insertion recess 27 serves as an escape portion for the second locking shaft portion 76. By forming the end portion of the insertion recess 27 in the same position in the axial direction as the fixing hole 28, it is possible to move the two second locking shaft portions 76, 76 of the spring member 7 into the two fixing holes 28, 28 by the elastic restoration force of the spring member (see FIGS. 6A to 6C).

The two first locking shaft portions 75, 75 of the spring member 7 are thus locked in the two locking recesses 26, 26 of the fixed bracket A, and the two second locking shaft portions 76, 76 are thus locked in the two fixing holes 28, 28. Therefore, the spring member 7 is very strongly fixed to the fixed bracket A and the movable bracket 4. Further, the application of force acting against the biasing force of the spring during the assembling operation may be continued till the two second locking shaft portions 76, 76 of the spring member 7 are initially inserted into the end portions of the two insertion recesses 27, 27. After this point of time, even if no force is applied, the first locking shaft portion 75 of the spring member 7 will be locked in the locking recess 26, and the two second locking shaft portions 76, 76 will be locked in the two fixing holes 28, 28 by the elastic restoration force of the spring. Therefore, a load on the worker performing the assembling operation is reduced and operation efficiency is increased.

Further, an assembling method for finally assembling the spring member 7 can be provided, it is not necessary to store separately the spring members 7 and the pre-assembled members, the spring member 7 does not fall off the pre-assembled member in the assembling process, and the assembling operation can be facilitated. Further, in the embodiment in which the insertion recess 27 communicates with the fixing hole 28, the second locking shaft portions 76, 76 of the spring member 7 do not interfere with the fixed bracket A and to not hinder the mounting operation, and the operation efficiency is high.

Another embodiment of the present invention will be described. The second aspect of the invention relating to the steering position adjustment device is wherein a rear end of the insertion recess and the fixing hole communicate with each other.

According to the second aspect of the present invention, since the insertion recess and the fixing hole communicate with each other, the second locking shaft portions are very smoothly guided to the fixing holes and locked therein at the same time as the first locking shaft portions are locked in the locking recesses by the elastic restoration force of the spring member. Therefore, assembling operability is improved.

What is claimed is:

1. A steering position adjustment device, comprising:
   a fixed bracket comprising flanges formed on both sides in a lateral direction of the fixed bracket;
   a movable bracket attached to the fixed bracket and comprising a column pipe mounted thereon; and
   a spring member,
   wherein each of the flanges comprises a tilted flange plate,
   wherein a locking piece protrudes from an end of the tilted flange plate of said each of the flanges,
   wherein an edge and a side of the locking piece are formed as a guiding edge,
   wherein a locking recess is formed on a rear side of the guiding edge, the locking recess extending from an end of the locking piece,
   wherein the guiding edge is formed to tilt towards the locking recess, a tilt of the guiding edge gradually increasing from a front side of the guiding edge towards the rear side of the guiding edge,
   wherein an insertion recess extends in the tilted flange plate of said each of the flanges,
   wherein, in the lateral direction, a position in the insertion recess substantially matches a position of the guiding edge,
   wherein a fixing hole is formed adjacently to the insertion recess,
   wherein an end of the locking recess and the fixing hole are formed such that, in the lateral direction, positions thereof substantially match each other,
   wherein, in the spring member, coil portions are formed at said both sides with an axial center of the column pipe being disposed therebetween,
   wherein first locking shaft portions extend from the coil portions,
   wherein second locking shaft portions extend from distal ends of the first locking shaft portions,
   wherein the first locking shaft portions are engaged with the locking recess and another locking recess,
   wherein the second locking shaft portions are further engaged with the fixing hole and another fixing hole,
   wherein a distance between the first locking shaft portions of the spring member is less than a distance between the guiding edge and another guiding edge of the fixed bracket, and
   wherein the distance between the guiding edge and said another guiding edge of the fixed bracket is the same as a distance between the insertion recess and another insertion recess of the fixed bracket.

2. The steering position adjustment device according to claim 1, wherein a through-hole is formed from an end of the insertion recess, and the insertion recess and the fixing holes are formed in a continuous manner through the through-hole.

3. The steering position adjustment device according to claim 1, wherein the tilt of the guiding edge continuously increases from the front side of the guiding edge towards the rear side of the guiding edge.

4. The steering position adjustment device according to claim 1, wherein the tilt of the guiding edge guides one of the first locking shaft portions of the spring member.

5. The steering position adjustment device according to claim 1, wherein the tilt of the guiding edge guides one of the first locking shaft portions of the spring member for locking into the locking recess.

6. The steering position adjustment device according to claim 1, wherein the position of the insertion recess coincides with the position of the guiding edge.

7. The steering position adjustment device according to claim 1, wherein one of the first locking shaft portions abuts the guiding edge.

8. A steering position adjustment device, comprising:
   a fixed bracket comprising flanges formed on both sides in a lateral direction of the fixed bracket;
   a movable bracket attached to the fixed bracket and comprising a column pipe mounted thereon; and
   a spring member,
   wherein each of the flanges comprises a tilted flange plate,
   wherein a locking piece protrudes from an end of the tilted flange plate of said each of the flanges,
   wherein an edge and a side of the locking piece are formed as a guiding edge,
   wherein a locking recess is formed on a rear side of the guiding edge, the locking recess extending from an end of the locking piece,
   wherein the guiding edge is formed to tilt towards the locking recess, a tilt of the guiding edge gradually increasing from a front side of the guiding edge towards the rear side of the guiding edge, wherein an insertion recess extends in the tilted flange plate of said each of the flanges, wherein, in the lateral direction, a position in the insertion recess substantially matches a position of the guiding edge, wherein a fixing hole is formed adjacently to the insertion recess, wherein an end of the locking recess and the fixing hole are formed such that, in the lateral direction, positions thereof substantially match each other, wherein, in the spring member, coil portions are formed at said both sides with an axial center of the column pipe being disposed therebetween, wherein first locking shaft portions extend from the coil portions, wherein second locking shaft portions extend from distal ends of the first locking shaft portions, wherein the first locking shaft portions are engaged with the locking recess and another locking recess, wherein the second locking shaft portions are further engaged with the fixing hole and another fixing hole, wherein a distance between the first locking shaft portions of the spring member is less than a distance between the guiding edge and another guiding edge of the fixed bracket, and wherein, when a force that expands the spring member is relaxed, the first locking shaft portions of the spring member are moved along the guiding edge and said another guiding edge for being guided in the locking recess and said another locking recess, respectively.

9. The steering position adjustment device according to claim 1, wherein, when one of the second locking shaft portions is inserted into an end portion of the insertion recess, the position of the insertion recess coincides with a position of the guiding edge in the lateral direction of the fixed bracket.

10. A steering position adjustment device, comprising:
a fixed bracket comprising flanges formed on both sides in a lateral direction of the fixed bracket;
a movable bracket attached to the fixed bracket and comprising a column pipe mounted thereon; and
a spring member,
wherein each of the flanges comprises a tilted flange plate,
wherein a locking piece protrudes from an end of the tilted flange plate of said each of the flanges,
wherein an edge and a side of the locking piece are formed as a guiding edge,
wherein a locking recess is formed on a rear side of the guiding edge, the locking recess extending from an end of the locking piece,
wherein the guiding edge is formed to tilt towards the locking recess, a tilt of the guiding edge gradually increasing from a front side of the guiding edge towards the rear side of the guiding edge,
wherein an insertion recess extends in the tilted flange plate of said each of the flanges,
wherein, in the lateral direction, a position in the insertion recess substantially matches a position of the guiding edge,
wherein a fixing hole is formed adjacently to the insertion recess,
wherein an end of the locking recess and the fixing hole are formed such that, in the lateral direction, positions thereof substantially match each other,
wherein, in the spring member, coil portions are formed at said both sides with an axial center of the column pipe being disposed therebetween,
wherein first locking shaft portions extend from the coil portions,
wherein second locking shaft portions extend from distal ends of the first locking shaft portions,
wherein the first locking shaft portions are engaged with the locking recess and another locking recess,
wherein the second locking shaft portions are further engaged with the fixing hole and another fixing hole,
wherein a distance between the first locking shaft portions of the spring member is less than a distance between the guiding edge and another guiding edge of the fixed bracket, and
wherein, when the second locking shaft portions are inserted into the insertion recess, the position of the insertion recess and a position of another insertion recess of the fixed bracket coincide with the position of the guiding edge and a position of said another guiding edge, respectively, in the lateral direction of the fixed bracket.

11. The steering position adjustment device according to claim 1, wherein, when one of the first locking shaft portions is locked in the locking recess, the spring member locks one of the second locking shaft portion in the fixing hole.

12. The steering position adjustment device according to claim 1, wherein, when the first locking shaft portions are moved along the guiding edge and said another guiding edge by the spring member, one of the second locking shaft portions is locked in the fixing hole.

13. The steering position adjustment device according to claim 1, wherein a distance between the end of the locking recess and an end of another locking recess is the same as a distance between the fixing hole and said another fixing hole.

14. The steering position adjustment device according to claim 1, wherein, in the lateral direction, lateral positions of the locking recess and the fixing hole are the same.

15. The steering position adjustment device according to claim 14, wherein, in the lateral direction, the position of the guiding edge and the position of the insertion recess are the same.

16. The steering position adjustment device according to claim 1, wherein, in the lateral direction, the position of the guiding edge and the position of the insertion recess are the same.

17. The steering position adjustment device according to claim 1, further comprising:
a through-hole extending laterally from the insertion recess toward the fixing hole.

18. The steering position adjustment device according to claim 17, wherein the insertion recess and the fixing holes are formed in a continuous manner through the through-hole.

19. The steering position adjustment device according to claim 1, wherein the insertion recess extends in one of the flanges to end at the fixing hole.

* * * * *